(12) United States Patent
Gobera Rubalcava et al.

(10) Patent No.: US 12,321,189 B2
(45) Date of Patent: Jun. 3, 2025

(54) CONVERSION OF HANDWRITING TO TEXT IN TEXT FIELDS

(71) Applicant: Apple Inc., Cupertino, CA (US)

(72) Inventors: Daniel E. Gobera Rubalcava, San Jose, CA (US); Ryan S. Dixon, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 16/855,946

(22) Filed: Apr. 22, 2020

(65) Prior Publication Data

US 2020/0356251 A1    Nov. 12, 2020

Related U.S. Application Data

(60) Provisional application No. 62/843,990, filed on May 6, 2019.

(51) Int. Cl.
*G06F 3/04883* (2022.01)

(52) U.S. Cl.
CPC ................. *G06F 3/04883* (2013.01)

(58) Field of Classification Search
CPC .................................................. G06F 3/04883
USPC ........ 715/268, 780, 835; 358/1.15; 370/389; 709/223; 345/442
See application file for complete search history.

(56) References Cited

U.S. PATENT DOCUMENTS

| | | |
|---|---|---|
| 8,140,994 B2 | 3/2012 | Feldman et al. |
| 8,255,822 B2 | 8/2012 | Markiewicz et al. |
| 9,454,694 B2 | 9/2016 | Novak et al. |
| 9,507,435 B2 | 11/2016 | Markiewicz et al. |
| 9,524,428 B2 | 12/2016 | Nicholson et al. |
| 9,886,626 B1* | 2/2018 | Stout .................. G06K 9/00174 |
| 2003/0179202 A1* | 9/2003 | Saund .................... G06F 3/0481 345/442 |
| 2006/0123159 A1 | 6/2006 | Clow et al. |
| 2007/0110047 A1* | 5/2007 | Kim ...................... G06F 16/954 370/389 |
| 2007/0112831 A1* | 5/2007 | Sarwono ............. H04L 41/0883 |
| 2012/0307296 A1* | 12/2012 | Sato ....................... G06F 3/1285 358/1.15 |
| 2014/0075004 A1* | 3/2014 | Van Dusen ....... G06F 16/90335 709/223 |
| 2014/0281947 A1* | 9/2014 | Zitnick, III ........... G06T 11/203 715/268 |

(Continued)

FOREIGN PATENT DOCUMENTS

WO    WO 2017/186350    11/2017

*Primary Examiner* — Ruay Ho
(74) *Attorney, Agent, or Firm* — BAKERHOSTETLER

(57) ABSTRACT

The subject technology receives, at a first position in a user interface, a set of input strokes. The subject technology retrieves information corresponding to one or more graphical elements of the user interface, the information comprising a second position of a text input field in the user interface. The subject technology determines, based at least in part on the first position and the second position that at least a portion of the set of input strokes overlaps at least a portion of the text input field. The subject technology performs handwriting recognition on the set of input strokes to provide a set of characters corresponding to the set of input strokes. The subject technology provides the set of characters for insertion into the text input field of the user interface.

19 Claims, 10 Drawing Sheets

(56) References Cited

U.S. PATENT DOCUMENTS

| | | | |
|---|---|---|---|
| 2014/0298266 A1* | 10/2014 | Lapp | G06F 3/04886 |
| | | | 715/835 |
| 2016/0070462 A1 | 3/2016 | Baudry et al. | |
| 2016/0179777 A1* | 6/2016 | Zhang | G06F 3/04883 |
| | | | 715/268 |
| 2017/0161866 A1* | 6/2017 | Baudry | G06V 30/1423 |
| 2017/0315634 A1 | 11/2017 | Koyama et al. | |
| 2018/0046605 A1* | 2/2018 | Hickey | G06F 3/04883 |

* cited by examiner

CONVERSION OF HANDWRITING TO TEXT IN TEXT FIELDS

CROSS-REFERENCE TO RELATED APPLICATIONS

The present application claims the benefit of U.S. Provisional Patent Application Ser. No. 62/843,990, entitled "Conversion of Handwriting to Text in Text Fields," filed May 6, 2019, which is hereby incorporated herein by reference in its entirety and made part of the present U.S. Utility patent application for all purposes.

TECHNICAL FIELD

The present description relates generally to processing input from an input device such as an electronic stylus or pen/pencil, and/or touch inputs, including handwritten text recognition.

BACKGROUND

Interaction with electronic devices can be performed using various input devices, such as touch screen displays, touch-sensitive surfaces, remote controls, mice and other input devices. Touch-sensitive surfaces and touch screen displays, in particular, have become increasingly popular input devices, as has providing handwritten input using such input devices. Providing for robust character recognition of handwritten input enhances the user's experience with the device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A handwriting input method may be an input method for electronic devices that include touch-sensitive surfaces (e.g., touch-sensitive screens, or touch-pads, etc.). Human handwriting may be vastly variable (e.g., in terms of stroke order, size, writing style, language, etc.), and reliable handwriting recognition software tends to be complex and may utilize a considerable training process. Implementing efficient handwriting recognition on an electronic device with limited computing resources and/or memory may be a non-trivial challenge.

Handwritten inputs can be received at an electronic device as, for example, one or more touch inputs and/or as inputs from an electronic stylus or pen/pencil. Such handwritten input can include handwritten text in one or more languages. However, text input fields of user interfaces utilized by the electronic device may be configured to receive alphanumeric keyboard input, as opposed to handwritten input. Such user interfaces may not be able to detect handwritten input inserted into text input fields, and/or when a user interface includes multiple text input fields, the user interface may not be able to determine which particular text input field received handwritten input is intended for. As the popularity of utilizing input mechanisms for inputting handwritten content increases, there may be a desire to support receiving handwritten input in any input field/area where keyboard input is accepted to improve productivity and user experience.

The subject system enables receiving stroke input data (e.g., from an electronic stylus) to provide handwritten input in any location in a user interface where a user can provide keyboard input, and/or other forms of input. Moreover, the subject system enables a low latency writing experience with an electronic stylus for recognition of handwriting in any input field where a keyboard could be utilized for providing text input.

Figure 1:
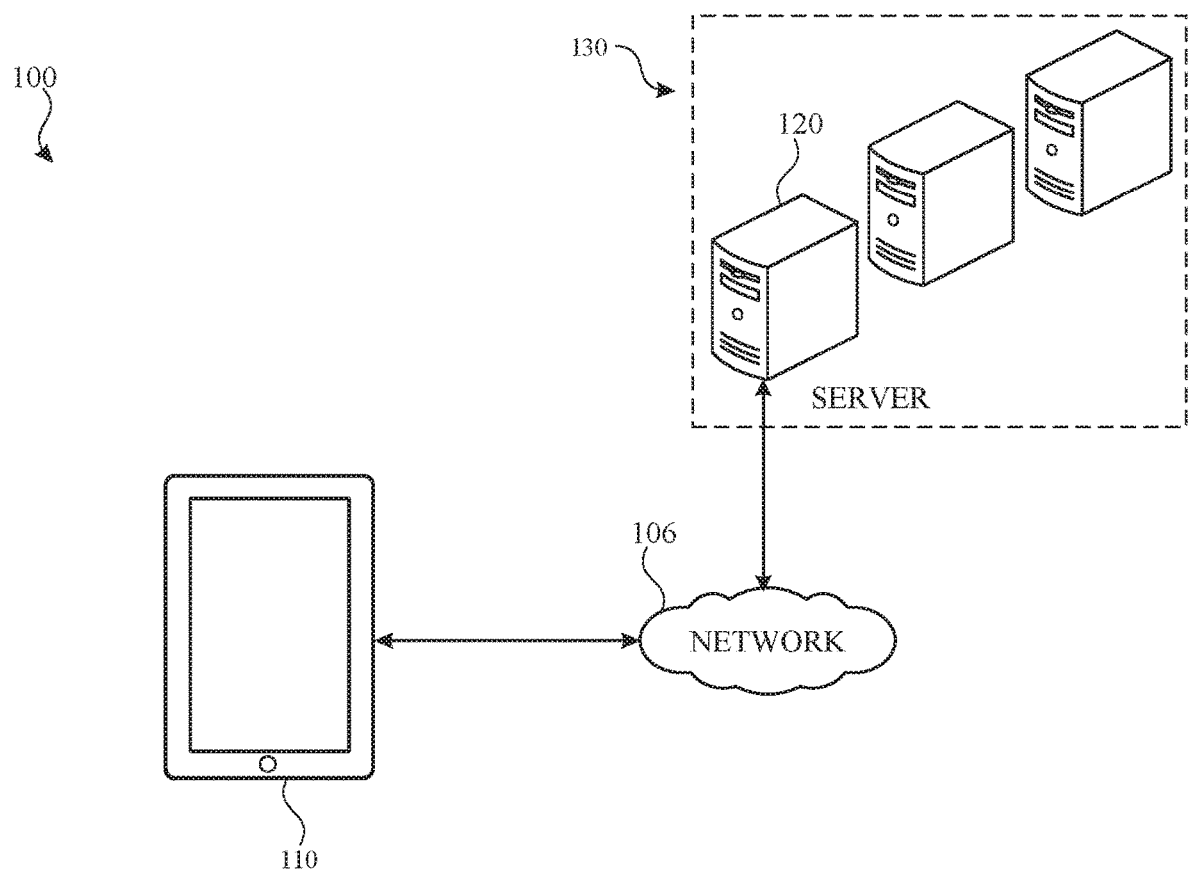
FIG. 1 illustrates an example network environment including an electronic device that may implement the subject system for conversion of handwriting to text for text input fields in accordance with one or more implementations.

FIG. 1 illustrates an example network environment 100 including an electronic device 110 that may implement the subject system for conversion of handwriting to text for text input fields in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110 and a server 120 that may be included in a group of servers 130. The network 106 may communicatively (directly or indirectly) couple, for example, the electronic device 110 with the server 120 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, and the group of servers 130; however, the network environment 100 may include any number of electronic devices and any number of servers or a data center including multiple servers. Further, the subject system may be implemented by the electronic device 110 independent of the network environment 100.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic device discussed below with respect to the electronic system discussed below with respect to FIG. 10.

The electronic device 110 may optionally include one or more contact intensity sensors. A contact intensity sensor may include one or more piezoresistive strain gauges, capacitive force sensors, electric force sensors, piezoelectric force sensors, optical force sensors, capacitive touch-sensitive surfaces, or other intensity sensors (e.g., sensors used to measure the force and/or pressure of a contact on a touch-sensitive surface). In an example, a contact intensity sensor can receive contact intensity information (e.g., pressure information or a proxy for pressure information) from the environment. Further, the electronic device 110 can also include at least one contact intensity sensor that is collocated with, or proximate to, a touch-sensitive surface. The electronic device 110, in one example, may also include at least one contact intensity sensor that is located on the back of the electronic device 110, opposite the touchscreen which may be located on the front of electronic device 110.

An intensity of a contact on a touch-sensitive surface (e.g., touchscreen, touchpad, etc.) can refer to a force or a pressure (force per unit area) of a contact (e.g., a finger contact or a stylus contact) on the touch-sensitive surface. Intensity of a contact can be determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Thus, it is appreciated that the contact intensity sensors provided by the electronic device 110 can measure a respective force measurement and/or a respective pressure measurement of a given contact on the touch-sensitive surface.

The electronic device 110 may implement the subject system to provide handwriting recognition via touchscreen and be configured to receive handwritten input via different input methods including touch input, and/or from an electronic stylus or pen/pencil. The electronic device 110 may implement the example software architecture for handwriting conversion to text for text input fields that is discussed further below with respect to FIG. 2. Examples of handwriting operations are discussed further below with respect to FIGS. 5-8B.

The subject system described herein may utilize a framework for handling graphics animation and/or operations for graphical user interfaces of a software application executing on a given electronic device (e.g., the electronic device 110). A framework can refer to a software environment that provides particular functionality as part of a larger software platform to facilitate development of software applications, and may provide one or more application programming interfaces (APIs) that may be utilized by developers to design, in a programmatic manner, user interfaces and to handle operations for such user interfaces including animations and layout of graphical elements. In an example, this framework provides components to implement a graphical, event-driven user interface that includes UI elements (e.g., windows, dialogs, labels, images, buttons, menus, text fields, pickers, sliders, switches, etc.), handles the rendering of UI elements and animations, and/or communicates with hardware devices and screen buffers.

For example, such a framework enables developers to create "views" for graphical user interfaces (GUIs) of a computer application. A view can be understood as a visual component of a given application's user interface that can be seen by a user, which can include one or more text input fields. In some examples, a view may be interacted with, by a user, in some manner. Moreover, the framework supports a user interface with a hierarchy of views such that at least one view can be included within another view, which can be further utilized to define a layout of views within the user interface and/or other properties associated with a set of views within the hierarchy. A tree structure may be provided to represent such a hierarchy of views (e.g., a "view hierarchy" such as the view hierarchy 250 discussed below with respect to FIG. 2) in which parent-child relationships between views are established between respective nodes in the tree structure.

The server 120 may be part of a network of computers or the group of servers 130, such as in a cloud computing or data center implementation. The server 120 and/or the group of servers 130 may store information, such as web pages and/or content provided therein, etc., that may be accessible on the electronic device 110. In one or more implementations, the electronic device 110 may support an operation that involves sending text based on converted handwriting to the server 120 and/or one or more servers from the group of servers 130.

Figure 2:
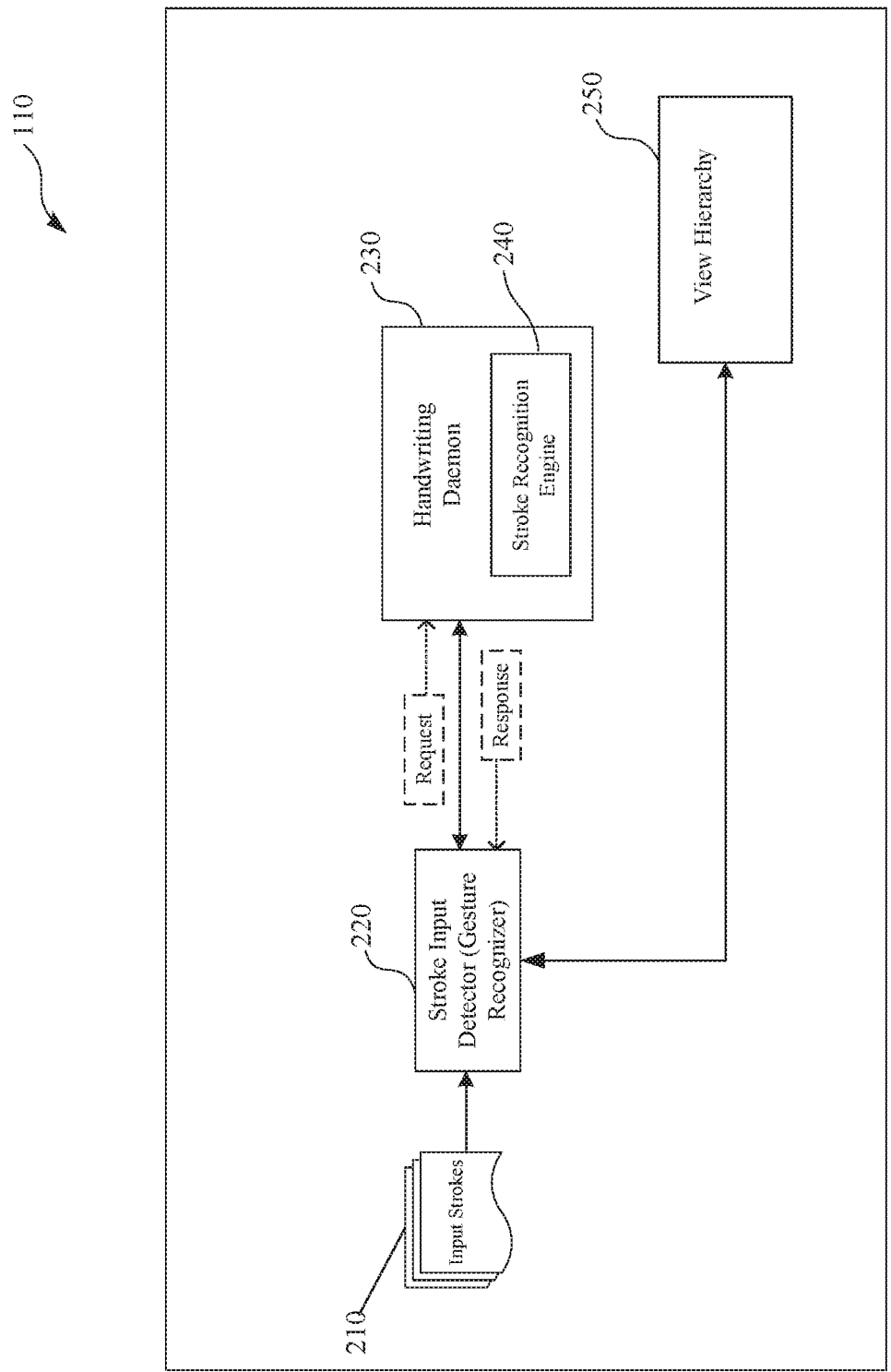
FIG. 2 illustrates an example software architecture that provides conversion of handwriting to text in text input fields in accordance with one or more implementations.

FIG. 2 illustrates an example software architecture that provides conversion of handwriting to text in text input fields in accordance with one or more implementations. For explanatory purposes, the software architecture 200 is described as being provided by the electronic device 110 of FIG. 1, such as by a processor and/or memory of the electronic device 110; however, the software architecture 200 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 2, the software architecture 200 represents a handwriting conversion system that includes a stroke input detector 220, and a handwriting daemon 230, and that accesses a view hierarchy 250 of a UI. An example view hierarchy 250 is discussed further below with respect to FIG. 4.

The stroke input detector 220 detects events in the form of input strokes 210 corresponding to handwritten input from a user, which may be received in a user interface of an application. In one or more implementations, the stroke input detector 220 determines for a given input stroke the time, location, direction, and/or stroke pressure for the input stroke. Stroke pressure as mentioned herein can refer to a measurement of pressure (e.g., force per unit area) of a contact (e.g., a finger contact or a stylus contact) corresponding to a stroke input on a given touch-sensitive surface (e.g., touchscreen, touchpad, etc.). The stroke input detector 220 samples multiple points within a stroke, takes a timestamp for each point sampled in each stroke. Each point within the stroke may include additional data such as location/proximity and/or stroke pressure. In an example, an input stroke can refer to stroke data received starting at stylus down (or an initial touch input) to stylus up (or a touch release), and, for each input stroke, a set of points that are part of each stroke are sampled.

In an implementation, the stroke input detector 220 performs a gesture recognition process, using a gesture recognizer component, on the received input strokes 210 using at least the aforementioned information and metrics. Examples of various gestures that can be recognized by the stroke input detector 220 are discussed further herein. The gesture recognizer component may be presented as a transparent window that overlays a user interface of an application where the gesture was detected. The gesture recognizer responds to events, such as the input strokes 210, and determines whether the input strokes 210 are within a threshold distance to a position of a text input field provided in a user interface (UI) of an application. In an example, the gesture recognizer determines this based at least in part on a respective position of at least one of the input strokes (e.g., a new input stroke) and a respective position of the text input field.

In an example, the gesture recognizer can traverse a view hierarchy of the UI of the application (e.g., a view hierarchy 250) to determine which text input fields are included in the UI including information related to respective positions of such text input fields. For example, the gesture recognizer can obtain respective positions of the text input fields based on information provided from one of the child nodes of the view hierarchy. Using the aforementioned information regarding the text input fields, the gesture recognizer can determine if the input strokes 210 are within the threshold distance to at least one of the text input fields.

The stroke input detector 220 is further configured to keep track of state of handwriting events that are occurring in the system by using a handwriting controller object that represents a current state of handwriting on the system. For example, stroke input detector 220 can determine whether the system is idle (e.g., not receiving handwriting inputs) or in a writing state where handwriting inputs are being received. In an implementation, the stroke input detector 220 can determine the state based on a predetermined timeout period (e.g., 1 second timeout period). If the timeout period has elapsed, the next input can be revaluated by the system to determine (e.g., by performing a new recognition process) whether the input is targeting a drawing or corresponds to a different gesture (e.g., tap).

In addition, the stroke input detector 220 may include a preview component for displaying previews of input strokes prior to and after such input strokes are recognized. In one implementation, when writing input stops, an incremental or live commit is performed where currently recognized handwriting in the form of converted text is displayed. In an example, the user writes a few words, (e.g., write "ABC, DEF, GHI"), the user will see the previous word, and as soon as a subsequent word is recognized the handwritten strokes of the subsequent word that the user provided will disappear, and the strokes turn into the final text.

In an implementation, the preview component can provide a floating preview of handwriting input. For example, the user starts writing and the strokes would remain displayed and a floating preview of the converted text is displayed, and when the user is finished writing, the user can tap on the floating preview and the system would insert the converted text into the text input field in which the handwritten strokes were input.

In some implementations, converting the handwriting input into text may be animated, such as by morphing the handwriting input to font-based text. In some implementations, the handwriting input is disassembled (e.g., into pieces or particles) and re-assembled as the text. For example, an algorithm may be used to divide the handwriting input into particles, and each particle may be mapped to a location on the corresponding text character. The particles may then be animated, such as by using a pre-defined effect, to move from the handwriting input to the mapped location on the corresponding text characters (thereby forming the corresponding text characters). In some implementations, the handwriting input dissolves or fades out and the font-based text dissolves-in or fades in. In some implementations, the handwriting input moves toward the final location of the font-based text (e.g., aligns itself with the text entry region or any pre-existing text) while dissolving and the font-based text concurrently appears while moving toward the final location. Thus, in some implementations, the handwriting input and the font-based text can be simultaneously displayed on the display during at least part of the animation (e.g., to reduce the animation time).

In some implementations, the handwritten input changes shape and size to result in the text. In some implementations, the animation includes changing the size, shape, color, and/or opacity of the handwritten input. In some embodiments, the handwritten input appears to be disassembled and re-assembled into the font-based text (e.g., disassembled and reassembled in large pieces, small pieces, particles, atomizing, any combination of the aforementioned, etc.). In some implementations, the handwritten input fades away and font-based text fades in.

In an implementation, the preview component can provide a live preview. For example, portions of recognized handwriting in the form of converted text are highlighted while the recognition process is running and the final complete text is not yet committed and provided for display, and after the recognition process is finished and the converted text is committed and displayed, the highlighting turns off.

In yet another implementation, the preview component may provide for display a colored dotted underline for recognized handwriting with multiple candidates with low confidence, and the user may perform a tap gesture for selecting and inserting particular candidate text.

The handwriting daemon 230 can receive, in a request from the stroke input detector 220, information based on the recognized gesture. In turn, the handwriting daemon 230 can forward such information in a request to the stroke recognition engine 240. In an example, such a request includes information related to the input strokes, and context information related to the text input field (e.g., text input field specific information indicating an expected type of input such as name, address, social security, or other types of input fields, and/or previous or existing text characters, if any).

In an implementation, the stroke recognition engine 240 is trained to recognize a large number of characters in one or more scripts (e.g., Chinese characters, Arabic letters, Farsi, Cyrillic, Latin script, artificial scripts such as emoji characters, etc.). In one or more implementations, the stroke recognition engine 240 compares combinations of the recognized characters with a lexicon or dictionary of words in the recognized language to determine candidate words, then assigns a confidence score for each candidate word (e.g., using a probabilistic algorithm to determine a confidence score of each candidate word).

Figure 3:
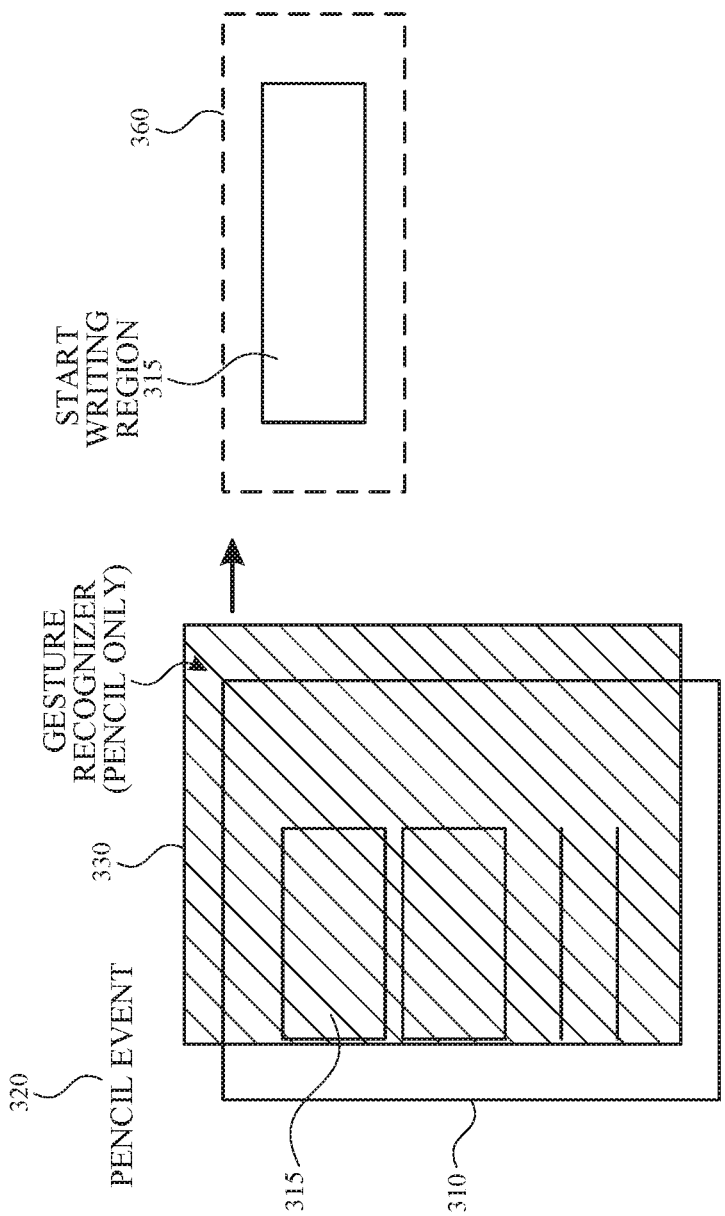
FIG. 3 illustrates an example of the gesture recognizer as described in FIG. 2 and a tolerance region around a text input field of a UI of an application.

FIG. 3 illustrates an example of the gesture recognizer (e.g., included in the stroke input detector 220) as described in FIG. 2 and a tolerance region around a text input field of a UI of an application.

As shown, a UI 300 of an application 310 includes text input field 315. When a touch event 320 is detected by the stroke input detector 220, the gesture recognizer can be presented as a transparent window 330 that overlays on top of the UI 300 of the application. The gesture recognizer then can perform a gesture recognition process as more events are received.

As further shown, the text input field 315 includes a tolerance region 360 that extends beyond the text input field 315. The text input field 315 is displayed as a region enclosed by a boundary line e.g., a rectangular region in FIG. 3. As described herein, a tolerance region refers to a region that surrounds a given displayed text input field, and/or extends past the boundary line of the text input field, where when handwriting input that begins within the tolerance region may be processed by the gesture recognizer in order initiate a recognition process to determine a gesture corresponding to the handwriting input and/or to convert such input to text characters. In one or more implementations, the boundary of the tolerance region 360 may not be displayed to the user. The system enables handwritten input received within the tolerance region 360 (e.g., to support handwriting input in smaller text input fields) to be included for conversion to text in the text input field 315. In an implementation, if handwriting input is first received outside of the tolerance region, then a recognition process of such handwriting input may not be performed by the handwriting conversion system.

Figure 4:
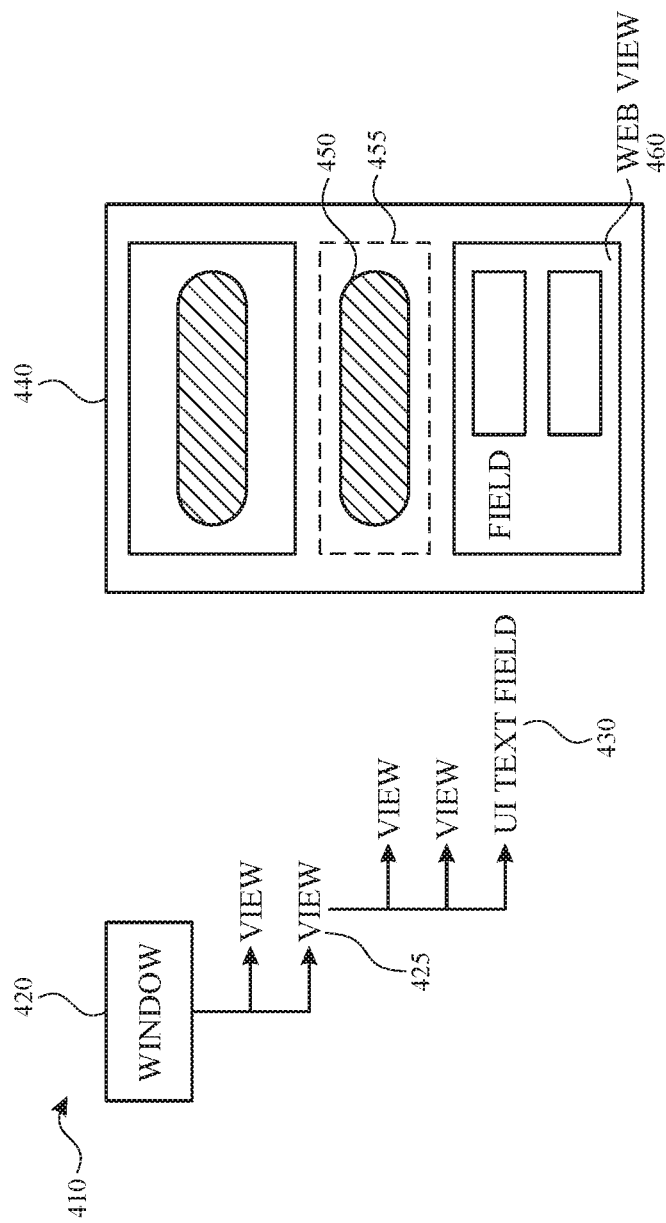
FIG. 4 illustrates an example of a view hierarchy and a corresponding user interface (UI) of an application. As discussed in FIG. 2, an application may include a view hierarchy for containing a set of views of a UI of the application.

FIG. 4 illustrates an example of a view hierarchy and a corresponding UI of an application. As discussed in FIG. 2, an application may include a view hierarchy for containing a set of views of a UI of the application.

As illustrated, a view hierarchy 410 includes a root view 420 (e.g., window) corresponding to a root node of the view hierarchy 410. The root view 420 includes a set of child views including a child view 425. The child view 425 includes a second child view 430 corresponding to a text input field.

As further illustrated, a UI 440 of an application includes a text input field 450 that corresponds to the second child view 430 of the view hierarchy 410. A tolerance region 455 around the text input field 450 is depicted for the purpose of illustration and is not visible to the user. The UI 440 also includes a web view 460 corresponding to web content (e.g., embedded HTML including one or more text input fields) that is displayed in the application.

In an implementation, the subject system can support insertion of converted handwriting into text fields in dynamically generated/retrieved user interfaces, such as a retrieved web page. In this example, the system communicates with an application framework that supports querying to determine whether the web page has text input fields. For example, the system can utilize such an application framework that enables web browser functionality in a given application such as the capability to interact with a web server, retrieve and render web pages, download files, and manage plug-ins. This application framework may include an API that provides access to content parsers (e.g., HTML, CSS), a script engine (interpreter) and/or a document object model (DOM) for the web page. In an example, the system utilizes the API to returns a list (and/or location) of all the text input elements that are visible with each region in the web page.

As discussed before in FIG. 2, the stroke input detector 220 can traverse a view hierarchy (e.g., the view hierarchy 410) corresponding to a UI of an application (e.g., the UI 440) to determine whether text input fields are included in the UI and information related to the positions such text input fields. Using the position information, the stroke input detector 220 can determine whether the input stroke data corresponds to a position of a text input field in the UI.

Figure 5:
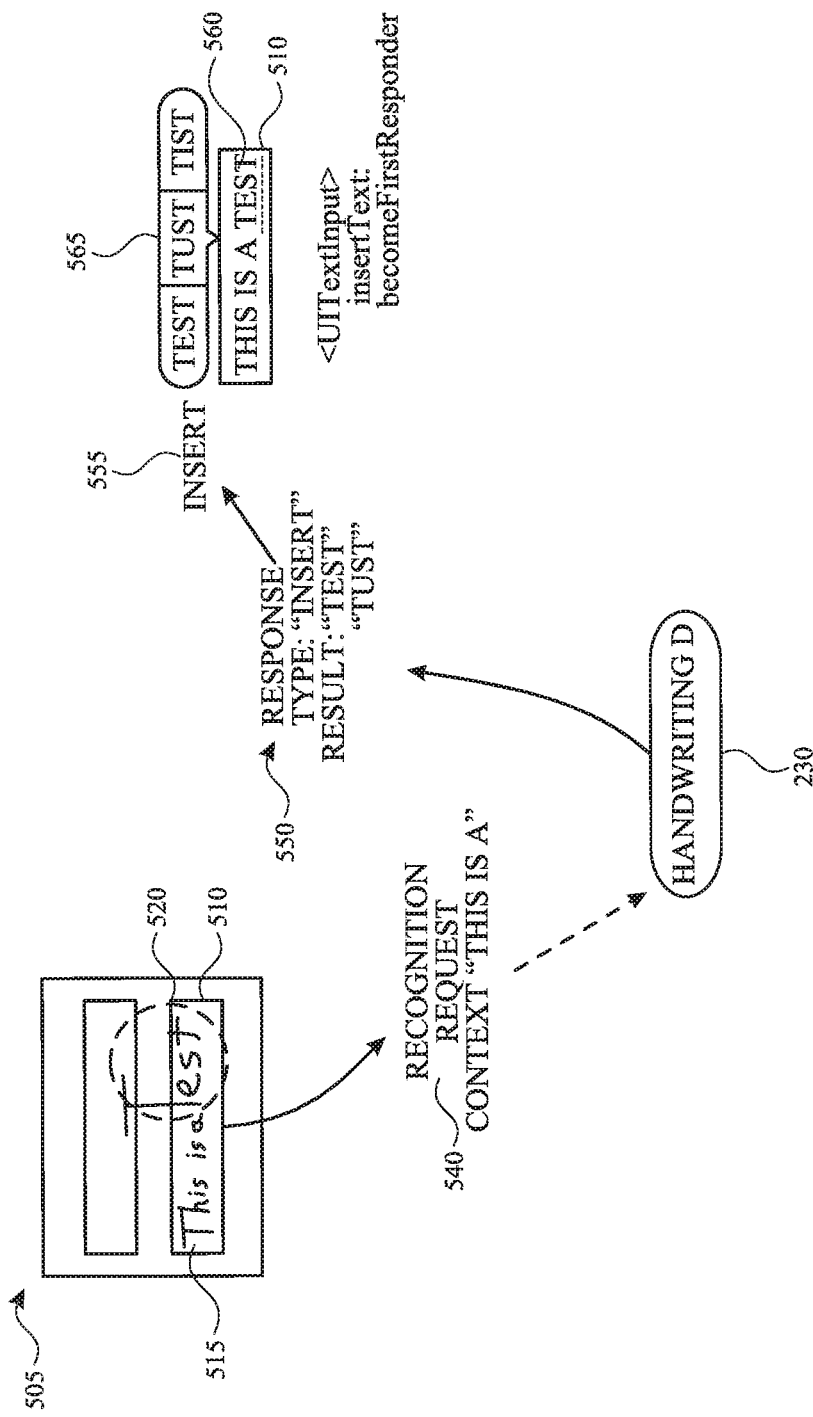
FIG. 5 illustrates an example of a communication flow, involving the handwriting conversion system of FIG. 2, for receiving input stroke data and performing recognition of the input stroke data received in a text input field of a UI of an application.

FIG. 5 illustrates an example of a communication flow, involving the handwriting conversion system of FIG. 2, for receiving input stroke data and performing recognition of the input stroke data received in a text input field of a UI of an application. FIG. 5 will be described with reference to components of the handwriting conversion system of FIG. 2.

As shown, a UI 505 includes a text input field 510. In the example of FIG. 5, existing text 515 is included in the text input field 510. New input stroke data 520 is received in the text input field 510, which is received by the stroke input detector 220. The new input stroke data 520 is sent by the stroke input detector 220 to the handwriting daemon 230 in a request 540 that includes information related to the new input stroke data and context information (e.g., the existing text 515).

The handwriting daemon 230 performs a recognition process (e.g., by sending information included in the request to the stroke recognition engine 240) which provides a set of results 550. As shown, the set of results 550 includes a type of operation (e.g., insert) and a set of candidate text results (e.g., test, tust, tist, etc.). The handwriting daemon 230 sends a response to the request with the set of results 550 to the stroke input detector 220.

The stroke input detector 220 receives the response from the handwriting daemon 230 with the set of results 550. Using the information in the set of results 550, the stroke input detector 220 determines to perform an insert operation 555 into the text input field 510 based on one of the candidate text results (e.g., test) corresponding to inserted text 560. In an implementation, a graphical element 565 can be displayed showing a set of candidate text results based on the set of candidate text results from the set of results 550.

Figure 6:
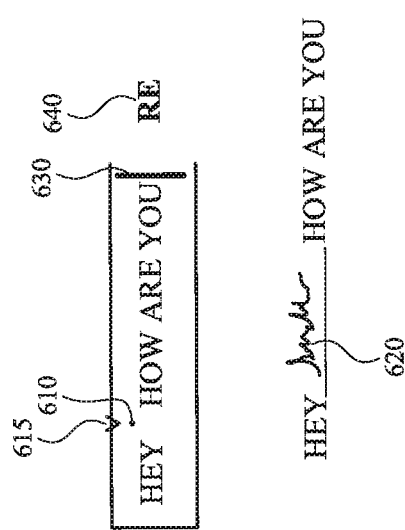
FIG. 6 illustrates examples various gestures for performing an insertion operation of handwriting input, involving the handwriting conversion system of FIG. 2, when received in a UI of an application.

FIG. 6 illustrates examples various gestures for performing an insertion operation of handwriting input, involving the handwriting conversion system of FIG. 2, when received in a UI of an application. FIG. 6 will be described with reference to components of the handwriting conversion system of FIG. 2.

As shown in FIG. 6, a user can provide handwriting input in the form of an input stroke 610 corresponding to a long press (or tap hold) gesture at a position within existing text in a text input field. In another example, the user can provide handwriting input in the form of a set of input strokes 615 resembling an inverted "carrot". In response to recognizing either of the input stroke 610 or the set of input strokes 615, the system can accept new input strokes 620 for converting into text and inserting into the text input field between the word "hey" and the word "how" in this example. In this example, the text corresponding to the new input strokes 620 is inserted before the text corresponding to "how" in the text input field. The system can determine, based on a distance metric (e.g., number of pixels), a location for inserting the text corresponding to the new input strokes 620.

As further illustrated in FIG. 6, the user can provide an input stroke 630 in the form of a vertical line to perform an insert operation in the text input field. In response to the input stroke 630, new input strokes 640 may be received for converting to text and inserting after the word "you" in the text input field. In this example, the system utilizes a combination of linguistic knowledge and spatial information to determine that the recognized characters of "re" are to be inserted after the word "you" in the text input field.

It is appreciated that other types of gestures are supported by the system in order to perform other operations. The following are examples of gestures for performing various operation in the system: 1) drawing a scribble/scratch out gesture to delete text, 2) drawing a horizontal line to select, 3) drawing a vertical line to insert a space; drawing a vertical line again to delete the same space, 4) performing a tap hold gesture to insert space between text, 5) drawing a carrot symbol (e.g., "^") to insert text, 6) performing a character level gesture to select or edit a single character, 7) performing a circling gesture to select text, and/or 8) drawing box shapes and/or regions to select text.

Figure 7:
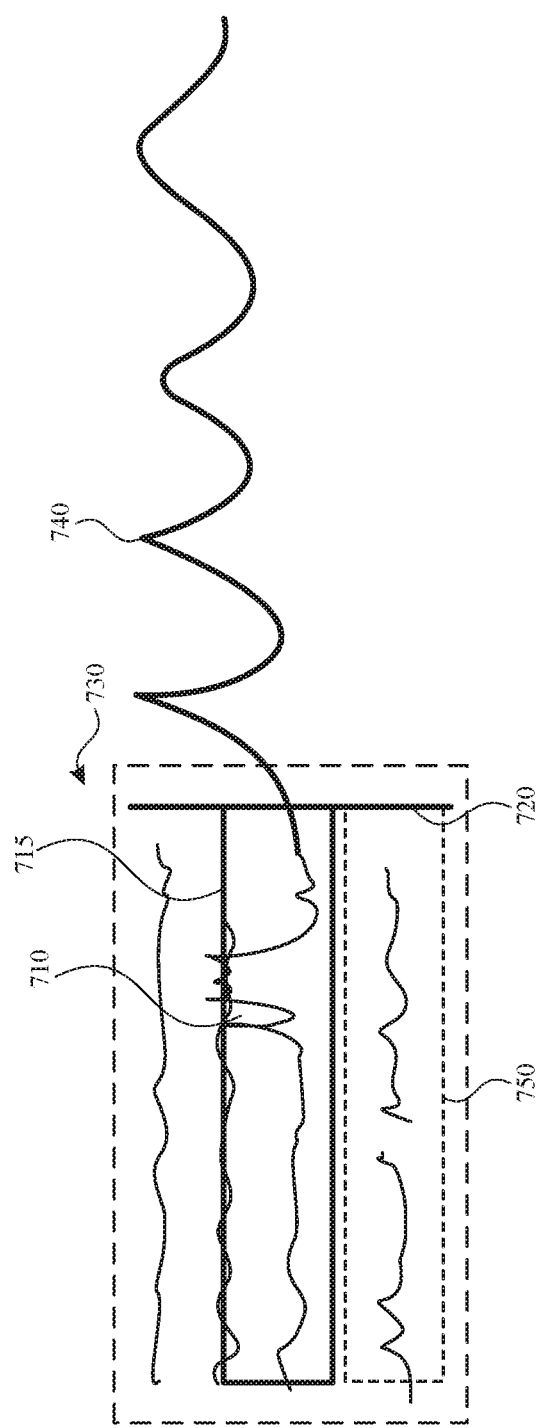
FIG. 7 illustrates an example of receiving handwriting input in a text input field that includes multiple lines of text where the handwriting input continues beyond a boundary of the text input field.

FIG. 7 illustrates an example of receiving handwriting input in a text input field that includes multiple lines of text where the handwriting input continues beyond a boundary 720 of the text input field. In this example, the handwriting conversion system receives new handwriting input at a position within existing text in the text input field and subsequently performs an insert operation within the existing text in a manner that preserves the existing text while placing the new text starting at the position in the paragraph based on the initial position of the handwriting input.

In FIG. 7, a set of input strokes 710 are received at a position in a text input field that already includes multiple lines of text (e.g., a paragraph) such that at least a portion of the set of input strokes overlaps the existing text. The set of input strokes 710 continues beyond the boundary 720 of the text input field. The system determines that the set of input strokes 710 has continued (e.g., a particular set of input strokes 740) beyond the boundary of the text input field, and, as illustrated, beyond a boundary of a tolerance region 730. The system continues to perform recognition on the set of input strokes 710 as additional input is received. Upon a timeout indicating that handwriting input has ceased, converted handwriting (e.g., text) is inserted into the text input field. In this example, since the new text to be inserted is based on the position that overlapped the existing paragraph text, the system can perform an insert operation that pushes existing text to a line 750 below and inserts the new text at the position and/or also including portion of the new text in the line 750 based on space constraints.

Figure 8A:
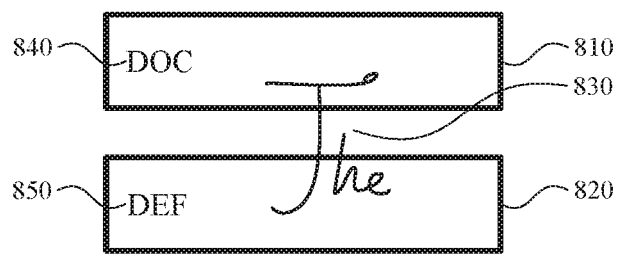
FIG. 8A and FIG. 8B illustrate different examples of overlapping handwriting input in multiple respective text input fields.
Figure 8B:
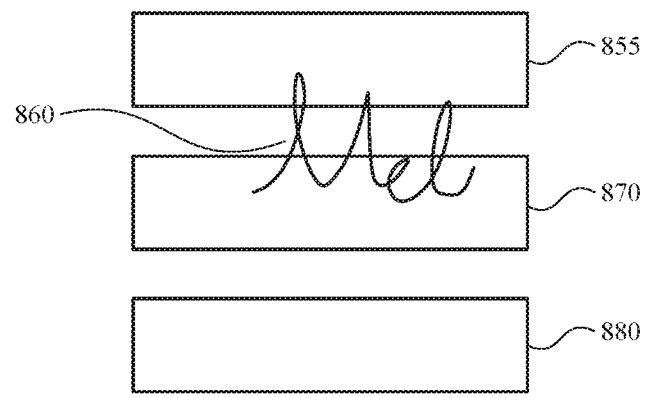

FIG. 8A and FIG. 8B illustrate different examples of overlapping handwriting input in multiple respective text input fields. The examples of FIG. 8A and FIG. 8B describe how the handwriting conversion system disambiguates between multiple text input fields.

As illustrated, FIG. 8A includes a text input field 810 and a second text input field 820. The text input field 810 includes (existing) text 840, and the second text input field includes (existing) text 850. The system receives handwriting input corresponding to a set of input strokes 830 which includes strokes that are overlap the text input field 810 and the second text input field 820. In this example, the system can utilize a set of heuristics in order to determine that the set of input strokes 860 should be included in the second text input field 820 instead of the text input field 810.

As illustrated, FIG. 8B includes a text input field 855, a second text input field 870, and a third text input field 880. The system receives handwriting input corresponding to a set of input strokes 860 which includes strokes that are overlap the text input field 855 and the second text input field 870. In this example, the system can utilize a set of heuristics in order to determine that the set of input strokes 860 should be included in the second text input field 870 instead of the text input field 855 and the third text input field 880.

Figure 9:
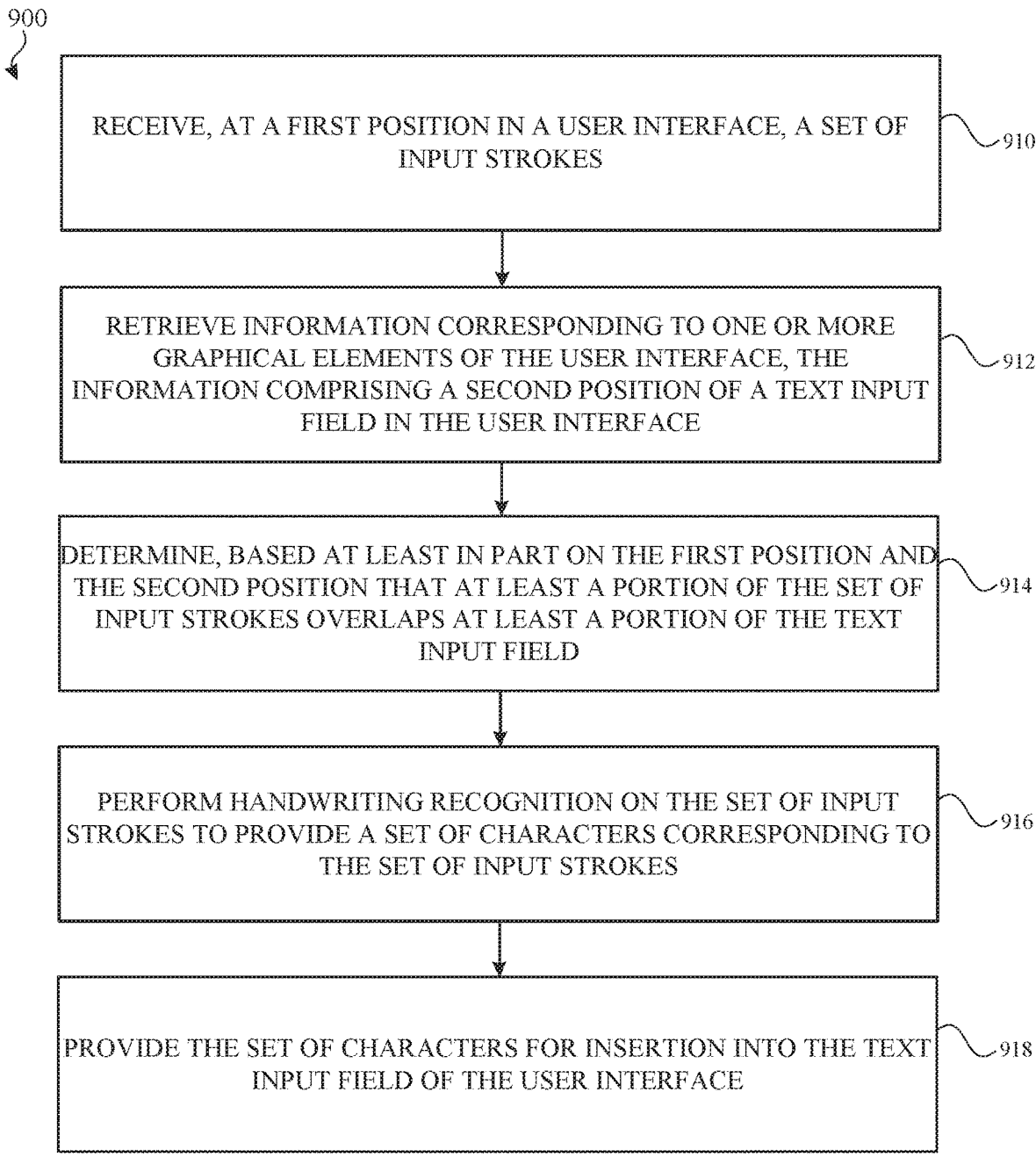
FIG. 9 illustrates a flow diagram of an example process for handwriting conversion to text for text input fields in accordance with one or more implementations.

FIG. 9 illustrates a flow diagram of an example process 900 for handwriting conversion of text for text input fields in accordance with one or more implementations. For explanatory purposes, the process 900 is primarily described herein with reference to components of the handwriting conversion system of FIG. 2, which may be executed by the electronic device 110 of FIG. 1. However, the process 900 is not limited to the electronic device 110, and one or more blocks (or operations) of the process 900 may be performed by one or more other components of other suitable devices and/or software applications. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The electronic device 110 receives, at a first position in a user interface, a set of input strokes (910). The electronic device 110 retrieves information corresponding to one or more graphical elements of the user interface, the information comprising a second position of a text input field in the user interface (912). The electronic device 110 determines, based at least in part on the first position and the second position that at least a portion of the set of input strokes overlaps at least a portion of the text input field (914). The electronic device 110 performing handwriting recognition on the set of input strokes to provide a set of characters corresponding to the set of input strokes (916). The electronic device 110 provides the set of characters for insertion into the text input field of the user interface (918).

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Figure 10:
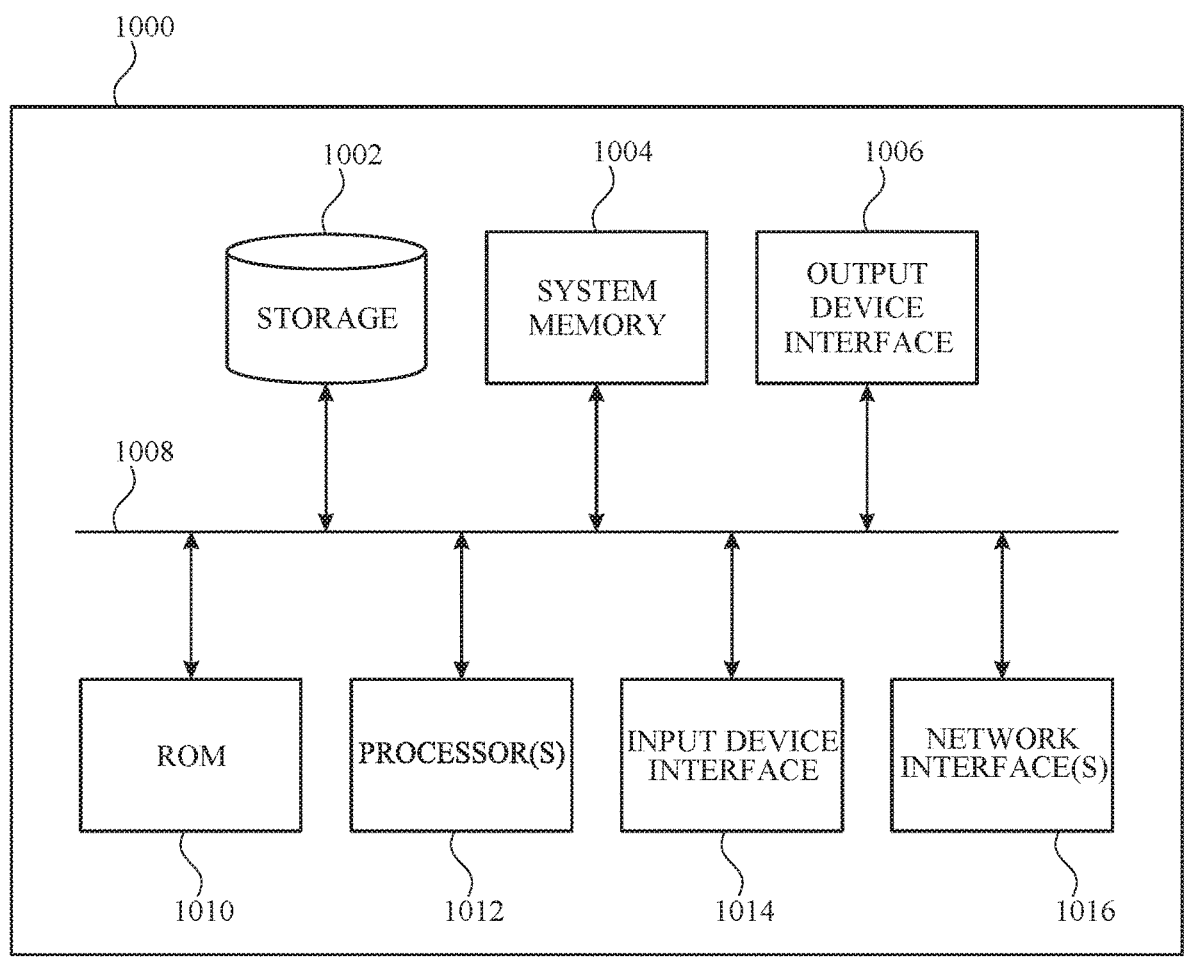
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, and/or the server 120 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    receiving, at a first position in a user interface, a set of input strokes;
    retrieving information corresponding to one or more graphical elements of the user interface, the information comprising a second position of a text input field in the user interface;
    determining, based at least in part on the first position and the second position that at least a portion of the set of input strokes overlaps at least a portion of the text input field and that the set of input strokes are within a tolerance region around, and defined by, the text input field;
    performing handwriting recognition on the set of input strokes to provide a set of characters corresponding to the set of input strokes; and
    providing the set of characters for insertion into the text input field of the user interface.

2. The method of claim 1, wherein the text input field is represented as a respective view in a first hierarchy of views, and the first hierarchy of views represents a user interface that includes the text input field.

3. The method of claim 2, further comprising:
    performing a traversal of the first hierarchy of views starting at a root node of the first hierarchy of views, the first hierarchy of views including the root node corresponding to a root view and a set of child nodes corresponding to respective child views; and
    determining that the text input field is included in one of the set of child nodes corresponding to one of the respective child views.

4. The method of claim 3, further comprising:
    invoking an insert function corresponding to a respective child view of the text input field to insert the set of characters into the text input field in the user interface of an application.

5. The method of claim 1, further comprising:
determining that a position of an initial input stroke of the received set of input strokes is between existing text characters that are present in the text input field; and
inserting the set of characters between the existing text characters based on the position of the initial input stroke from the received set of input strokes.

6. The method of claim 5, further comprising:
receiving a second set of input strokes;
determining that the second set of input strokes corresponds to a handwriting gesture for deleting one or more text characters; and
deleting at least a portion of the inserted set of characters.

7. The method of claim 6, where the handwriting gesture comprises one of a scribble gesture or a strikethrough gesture.

8. The method of claim 5, further comprising:
receiving a second set of input strokes;
determining that at least some of the second set of input strokes overlap the text input field and a different text input field;
performing handwriting recognition on the second set of input strokes to provide a second set of characters corresponding to the second set of input strokes;
performing disambiguation of the second set of input strokes based at least in part on the second set of characters and the inserted set of characters in the text input field; and
determining which of the text input field and the different text input field to insert the second set of characters based at least in part on the disambiguation of the second set of input strokes.

9. The method of claim 1, further comprising:
providing for display the user interface of an application including the set of characters inserted into the text input field in the user interface of the application.

10. The method of claim 1, wherein the text input field is included in a web page displayed in the user interface of an application.

11. The method of claim 10, further comprising:
sending a request to a user interface framework corresponding to the web page to determine a position of the text input field in the web page.

12. The method of claim 1, wherein receiving, at the first position in the user interface, the set of input strokes comprises receiving, at the first position in the user interface and within a displayed boundary of the text input field, the set of input strokes.

13. A system comprising:
a processor;
a memory device containing instructions, which when executed by the processor cause the processor to provide:
an stroke input detector configured to:
detect a new input stroke;
determine that the new input stroke corresponds to a text input field included in a user interface of an application, and that the new input stroke is within a tolerance region around, and defined by, the text input field, based at least in part on a first position of the new input stroke and a second position of the text input field; and
a handwriting daemon configured to:
receive the detected new input stroke from the stroke input detector;
a recognition engine configured to:
perform handwriting recognition on the new input stroke corresponding to the text input field; and
provide a set of characters for insertion into the text input field based at least in part on the performed handwriting recognition.

14. The system of claim 13, wherein the stroke input detector is further configured to:
detect a gesture and forward the detected gesture to the handwriting daemon, and
wherein the handwriting daemon further comprises:
a gesture recognizer component configured to determine if the new input stroke is within a threshold distance to the text input field.

15. The system of claim 14, wherein the text input field is enabled to receive input from a keyboard.

16. The system of claim 13, wherein the text input field is represented as a respective view in a first hierarchy of views, and the first hierarchy of views represents a user interface that includes the text input field.

17. The system of claim 16, wherein the stroke input detector is further configured to:
perform a traversal of the first hierarchy of views starting at a root node of the first hierarchy of views, the first hierarchy of views including the root node corresponding to a root view and a set of child nodes corresponding to respective child views;
determine that the text input field is included in one of the set of child nodes corresponding to one of the respective child views; and
obtain the second position of the text input field from the one of the set of child nodes.

18. The system of claim 17, wherein the handwriting daemon is further configured to:
invoke an insert function corresponding to a respective child view of the text input field to insert the set of characters into the text input field in the user interface of the application.

19. A non-transitory computer-readable medium comprising instructions, which when executed by a computing device, cause the computing device to perform operations comprising:
receiving, at a first position in a user interface, a set of input strokes;
retrieving information corresponding to one or more graphical elements of the user interface, the information comprising a second position of a text input field in the user interface;
determining, based at least in part on the first position and the second position that at least a portion of the set of input strokes overlaps at least a portion of the text input field and that the set of input strokes are within a tolerance region around, and defined by, the text input field;
performing handwriting recognition on the set of input strokes to provide a set of characters corresponding to the set of input strokes; and
providing the set of characters for insertion into the text input field of the user interface.

* * * * *